Inventors
F.P.MASON-
R.G.STEMP
By [signature]
Agent

Jan. 2, 1962 F. P. MASON ET AL 3,015,690

FACSIMILE APPARATUS

Filed Nov. 2, 1959 4 Sheets-Sheet 2

Inventors
F.P.MASON-
R.G.STEMP

By [signature]
Agent

Jan. 2, 1962 F. P. MASON ET AL 3,015,690

FACSIMILE APPARATUS

Filed Nov. 2, 1959 4 Sheets-Sheet 3

Inventors
F.P.MASON-
R.G.STEMP
By [signature]
Agent

*Inventors*
F.P.MASON-
R.G.STEMP
By [signature]
Agent

United States Patent Office 3,015,690

Patented Jan. 2, 1962

3,015,690

FACSIMILE APPARATUS

Frederick Percival Mason and Ronald Gilbert Stemp, Croydon, England, assignors to Creed & Company Limited, Croydon, England, a company of Great Britain Filed Nov. 2, 1959, Ser. No. 850,146
Claims priority, application Great Britain Nov. 20, 1958
12 Claims. (Cl. 178—7.1)

This invention relates to improvements in or relating to facsimile apparatus.

In many facsimile systems, a message form to be scanned is located on a rotatable drum and phasing between the transmitting and receiving drums may be accomplished either by allowing one drum to operate at a speed slightly different from the other and annulling the speed difference at the instant of identity of phase, or by allowing the two drums to accelerate until prevented from further acceleration by engagement with pilot members which have constant identity of phase, or by imparting high acceleration to both drums at the same instant by their being engaged synchronously by rotating shafts.

Of these basic methods it is advantageous to choose the last in cases when identity of phase must be established in the minimum of time. The high rate of acceleration required results, however, in the need for powerful driving motors. Where a source of power common to both the transmitter and receiver is unavailable, local sources of high-frequency stability have to be provided. Such sources are costly and their cost is greater for more powerful driving motors.

The inertia of these well known drum-type scanning systems is the sum of the inertias of the message-form, of the drum, and of the members for attaching the form to the drum. Of these three components the drum inertia is generally the largest. In any ideal system the inertia would be that of the message-form alone.

In the preferred arrangement according to the present invention, the inertia exceeds that of the message form only by that of a message form towing-bar and its supporting and driving members.

According to the present invention there is provided facsimile apparatus comprising a drum, scanning means for scanning a message-form, means for moving the message-form over the surface of the drum and relative thereto to effect a scanning operation, and means for maintaining any portion of the message-form being scanned in a scanning position against the surface of the drum.

Figures 1, 1A:
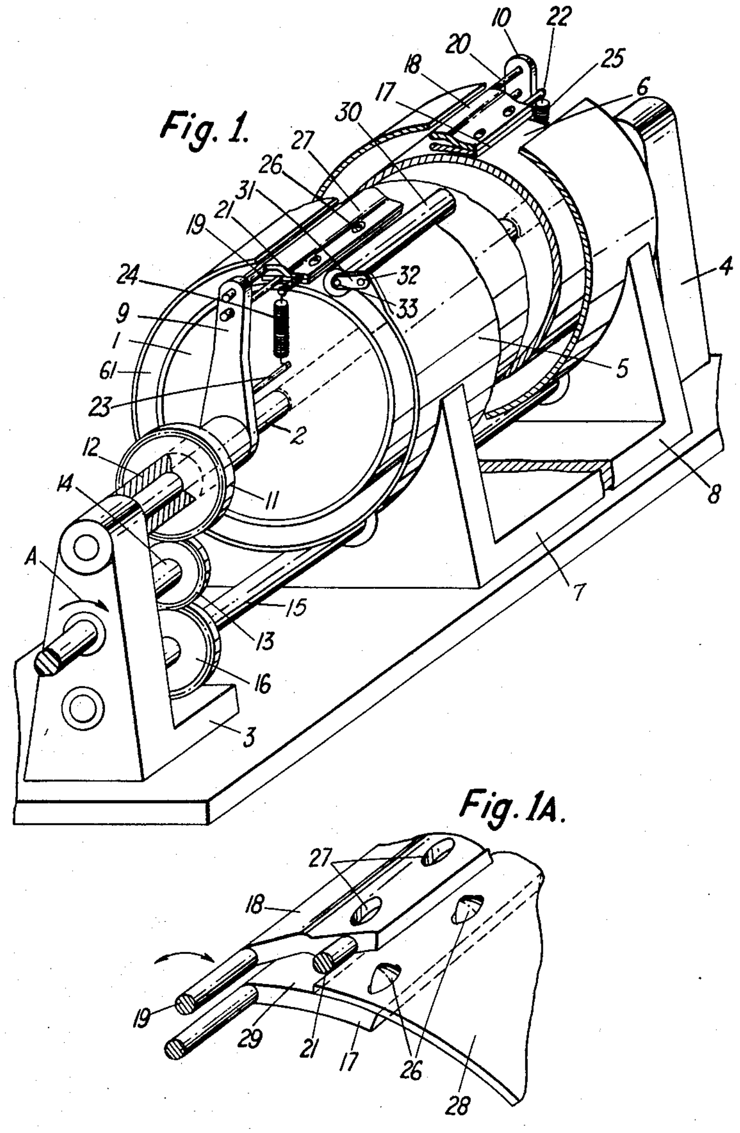
Figure 2:
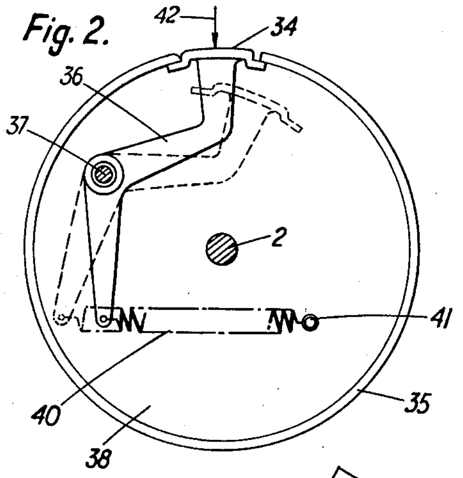
Figures 3, 3A:
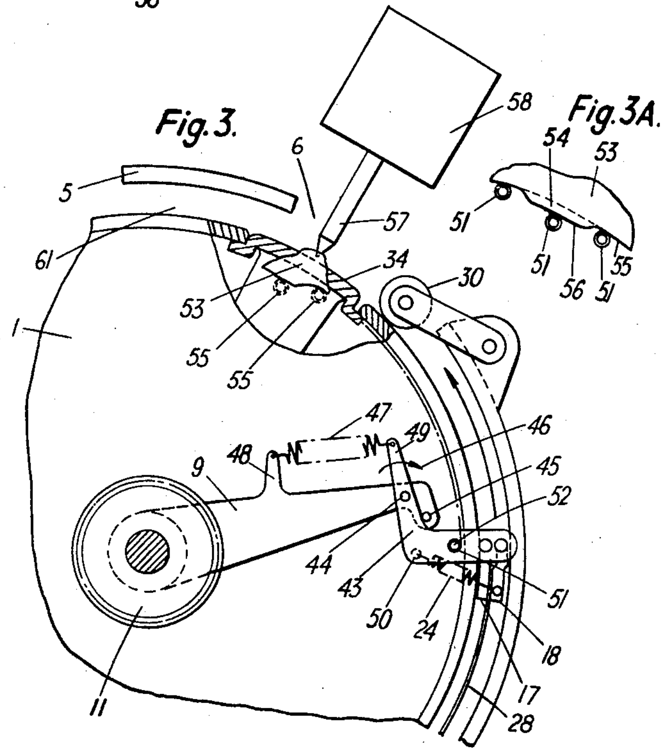
Figure 4:
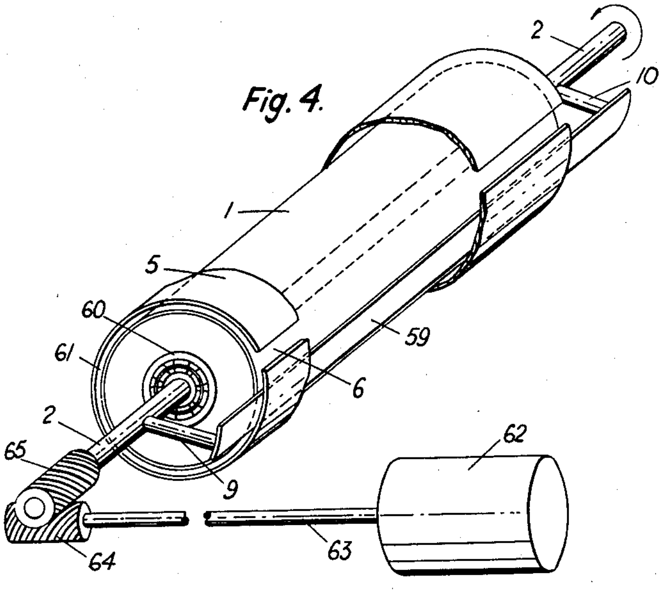
Figures 5, 5A, 5B:
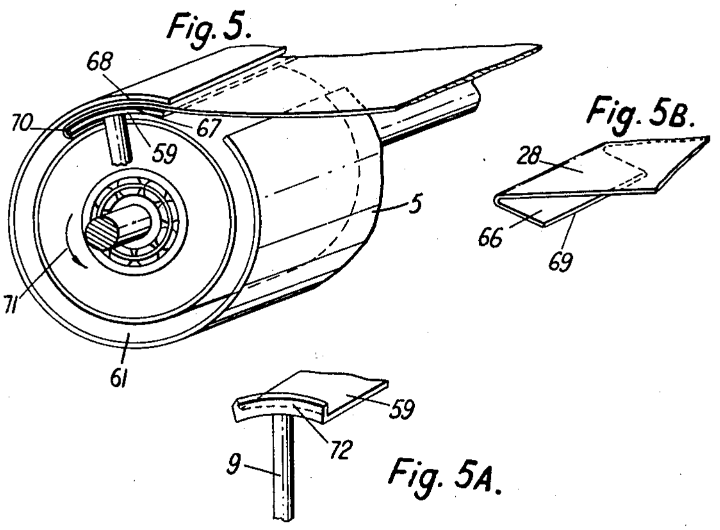

The invention will now be described in detail with reference to the accompanying drawings, in which:

FIG. 1 shows one embodiment of the invention,

FIG. 1*a* shows on a larger scale a detail of FIG. 1,

FIGS. 2, 3 and 3*a* taken together, show how it is possible for a towing bar drawing a message form to be moved down under a stylus, FIGS. 4, 5, 5*a*, and 5*b* show another embodiment of the invention, and FIGS. 6 to 9 show other towing bar arrangements for a message form which may be used instead of either of the towing bars shown in the embodiments of FIG. 1 or FIGS. 4 and 5.

Referring now to FIG. 1 there is shown a drum 1 which is rigidly and concentrically mounted on a shaft 2 which is in turn securely held in mounting brackets 3 and 4. The drum 1 in the present embodiment is a hollow cylinder. An open ended cylinder 5, having a longitudinal aperture 6, is securely mounted on brackets 7 and 8 and arranged coaxially with the drum 1. The external circumference of the drum is sufficient to accommodate a message-form, whilst the internal circumference of the open-ended cylinder 5 is somewhat greater so that there exists an annular space 61 therebetween The radial magnitude of the annular space 61 is somewhat greater than the thickness of a message-form and is capable of accommodating a towing-bar to which the message-form is attached and which is to be described later herein.

Each one of a pair of radial arms 9 and 10 is securely attached to a pinion wheel such as the pinion wheel 11 which is shown attached to radial arm 9. Each pinion wheel is mounted and free to rotate on shaft 2 and is spaced from brackets 3 and 4 by a spacing member such as that designated 12. Pinion wheel 11 is driven by driving gear 13 on shaft 14, whilst the pinion wheel on which radial arm 10 is mounted beyond the other end of drum 1 is driven by an idler gear (not shown) similar to driving gear 13 and a further gear (not shown) on the end of shaft 15 which is in turn driven through gear 16.

It will be seen that rotation of the shaft 14, with driving gear 13 thereon, will cause both radial arms 9 and 10 to rotate in the same direction in synchronism. Radial arms 9 and 10 are assembled on the shaft 2 in radial alignment one to the other, and arranged to carry a towing-bar for a message-form. The towing-bar comprises a lower jaw 17 (see also FIG. 1*a*) and an upper jaw 18 which together constitute securing means for the message-form. The lower jaw 17 is rigidly assembled to radial arms 9 and 10 whilst the upper jaw 18 assembled to the radial arms such that it is pivotable about the centres of spindles 19 and 20 attached thereto and which are in turn free to rotate in the radial arms 9 and 10 respectively. Lugs 21 and 22 are fitted to the ends of the upper jaw 18, whilst a second pair of lugs, only one of which is shown and which is designated 23 are fitted to the radial arms in a position near to the shaft 2. Tension springs 24 and 25 are assembled between the lugs 21 and 22 and their respective lugs on the radial arms 9 and 10, so that the upper and lower jaws are normally closed, but may be opened by pivoting the upper jaw about the centres of spindles 19 and 20 against the tension of the springs 24 and 25. A series of pins 26, which may be conical in shape are fitted in alignment along the upper surface of the lower jaw 17 and arranged to mate with a series of holes 27 which are drilled through the upper jaw 18, and by which means a message-form, having a like series of holes parallel and near to its upper edge may be gripped and retained between the upper and lower jaws. Alternatively the message-form may be devoid of holes, and relies on the action of the closing of the upper and lower jaws to grip the message form either indenting it or causing holes to be pierced therein by the pins.

FIG. 1*a* shows a part-sectioned view of a message-form 28 located on the lower jaw 17 with pins 26 thereon extending through the series of holes in the message-form; the upper jaw 18 is then pivoted about spindle 19 and spindle 20 of FIG. 1 at its other end, so as to grip the message-form between its under surface and the upper surface of the lower jaw with the pins 26 extending into holes 23.

The gap 29 between upper and lower jaws has been shown exaggerated for the purpose of clarity; in practice this gap would not exceed much more than the thickness of the message-form when the jaws are closed. In certain circumstances the gap may even be the same thickness as the message-form or even less. It will be seen then that if shaft 14 is rotated in the direction of arrow A, the towing bar with the message-form 28, will sweep around the annular space between the drum 1 and cylinder 5 and in doing so will drag the message-form with it. The message-form will in consequence execute a similar motion to that which it would execute if fastened to the surface of a rotating drum, although the drum 1 in this instance is fixed and unable to rotate.

The aperture 6 in the cylinder 5 of FIG. 1 whilst permitting loading of the message-form 28 onto the towing-bar also permits access to the message-form by a scanning head (not shown) of the transmitting or receiving type which is arranged so that it is capable of motion parallel with the aperture 6. Means such as a roller may be provided to bear lightly on the rotating message-form to maintain it in contact with the drum 1 as near as possible to the scanning point so that the message-form is kept in a correct scanning position with respect to the scanning head. One end of such a roller is shown FIG. 1 and designated 30, and is retained on the cylinder 5 by a connecting arm at each end, one of which is shown designated 31, and each of which is pivoted about a pin, such as that which is designated 32, the roller being free to rotate on spindle 33 extending co-axially along its length and anchored in the connecting arms at each end.

A receiver scanning head, co-operating with the scanner may comprise a stylus suitably mounted in means for transporting it across the outer cylinder over the aperture therein, and arranged so that the stylus itself has access through the aperture to mark the message-form in response to a picture signal. In general it is desirable to have the tip of the stylus as near to the message-form as possible. In such an arrangement, the position of the tip of the stylus with respect to the message-form is such that the towing-bar, during its rotation, would come into contact with the stylus and cause damage or displace it from its true operating position in the aperture 6. In order to eliminate this danger, means may be provided either to cause the stylus to be lifted away from the message-form during the passage of the towing-bar beneath the aperture, or to provide a longitudinal and, for example, parallel sector in the circumferential surface of the drum which may be moved inward by the towing-bar at that portion of its rotation which is just prior to its passage past the stylus. An arrangement which may, for example, provide the latter mentioned facility is shown in FIGS. 2 and 3, and in which FIG. 2, shows a side elevation in section of the drum 1 having a longitudinal and parallel sector 34 forming part of the circumferential surface 35.

The supporting means for the sector is the same at each end of the drum and comprises an arm 36 rigidly attached to the underside of the sector 34 and pivoted about a pin 37 fitted to the internal face 38 of the end wall of the drum. A tension spring 40 is fitted between an extending portion of the arm 36 and a second pin 41 also fitted to the internal face of the end wall of the drum.

It will be seen that if the spring is in tension, the sector 34 will assume the position shown, and if pressure is applied to the sector in the direction of the arrow 42 then it will be forced to pivot on its arms 36 about pins 37 and assume the position shown by the dotted outline.

Means may be incorporated in the towing-bar assembly to cause depression of the sector by the towing-bar itself during its passage round the drum in the annular space between the drum and the outer cylinder 5. Such means are shown in FIG. 3. This figure shows the arrangement beyond one end of the drum, the arrangement at the other end being the same, hence the operation will be described with reference to one end only. The radial arm 9 is modified to carry a secondary arm 43 pivoted on a pin 44 fitted to the radial arm, a stop pin 45 is fitted to the radial arm 9 to prevent the secondary arm moving in a counter-direction to that indicated by the arrow 46. The secondary arm is held against the stop pin 45 by the provision of a tension spring 47 fitted between extending portions 48 and 49 of the radial arm 9 and secondary arm 43 respectively. The towing-bar comprising lower and upper jaws 17 and 18 is carried by the secondary arms such as 43, the jaws being assembled thereto in a manner similar to that shown in FIG. 1 in which they are assembled to the radial arms 9 and 10. A pin such as that designated 50 is fitted to each of the secondary arms in order that a tension spring 24 at each end and holding lower and upper jaws in the closed position may also be accommodated. A roller 51 on a pin 52 is fitted on the outside of each of the secondary arms, such as 43, and it is the purpose of each roller to engage a fixed cam-plate rigidly mounted beyond each end of the drum. A view of part of such a cam-plate is shown in FIG. 3*a*. Each cam-plate has a humped portion 54 constituting part of a track over which the roller 51 travels. During rotation of the radial and secondary arms, each of the rollers 51 first engages part of the track designated 55 of its respective cam-plate and is then caused to ride up onto the humped portion and over that part of the track which is designated 56. Due to the positioning of the fixed cam-plate, each roller 51 is caused to ride up onto the humped portion of its respective cam-plate at a time just before the towing-bar starts to pass over the sector 34 of the drum 1 (the positions of the rollers are shown dotted in the drawing of FIG. 3 before and during this process). In consequence the secondary arms are caused to pivot about their pins 44 in the direction of arrow 46, the towing-bar is caused to move so that the underside of the lower jaw 17 thereof presses against the upper surface of the sector 34, which in turn moves inwardly against the tension of springs 40, shown in FIG. 2, and for a short period during its rotation the towing-bar occupies the space vacated by the sector 34 in the drum 1. During this short period, the inward movement of the towing-bar, together with its rotational movement, allows it to clear the stylus 57 on the scanning head 58.

In the event of a requirement for moving the stylus away from the aperture 6 of the cylinder 5 during the passage of the towing-bar past the aperture, a cam may be fitted to the shaft 2 so that as the towing-bar approaches the aperture the cam causes a switch to be operated for a sufficient period of time during which a strong source of spacing potential is applied to the scanning head. This strong potential is arranged to cause the stylus to be lifted away from the message-form and in consequence a clear passage is made available for the towing-bar during its passage past the aperture.

FIG. 4 shows an alternative embodiment of the invention for use with a transmitter scanning head or a receiver scanning head in an arrangement where the stylus is lifted away from the message-form to allow for the passage of the towing-bar past the aperture 6 as has just been described. In this embodiment the towing-bar comprises a single bar 59 supported on a rotatable shaft 2 by radial arms 9 and 10. The drum 1 is located on the shaft 2 by a ball-race at each end of the drum such as that which is designated by the reference numeral 60. The cylinder 5 with a longitudinal aperture 6 is arranged to concentrically enclose a drum 1 and is mounted on brackets (not shown) similar to those shown in FIG. 1. The towing-bar 59 is driven around the annular space 61 between the drum 1 and the cylinder 5 by motor 62 through shaft 63 and gears 64 and 65. It will readily be understood that even though drum 1 is free to rotate on shaft 2, the inertial-force due to its weight will be considerably decreased, since on rotation of shaft 2, the drum will tend to remain stationary whilst the message-form is drawn into and transported around the annular space 61 between the drum 1 and the cylinder 5. The only inertial forces that need to be overcome during operation are those due to the towing-bar and its driving means together with the rolling frictional forces in the bearings on which the drum is supported.

FIG. 5 shows the arrangement of the message-form with respect to the towing-bar. In this figure, the message-form 28 shown in part-section in FIG. 5A, has no perforations and has instead, a bent parallel portion 66 at one end. On loading the message-form onto the towing-bar 59, the bent portion is inserted in the aperture 6 between the upper surface 67 of the towing-bar and the internal surface 68 of the cylinder 5 until the free edge 69 is clear of the leading edge 70 of the towing-bar, after which the message-form 28 is drawn back so that the bent portion is beneath the towing-bar 59. Movement of the towing-bar in the direction of the arrow 71 will cause the message-form to be drawn into the annular space 61 between the drum 1 and the cylinder 5. Lateral movement of the message-form 28 may be prevented by incorporating a flange 72 at each end of the towing-bar as shown at the bottom of FIG. 4, the height of which is approximately equal to the thickness of the message-form.

Figures 6, 7, 8:
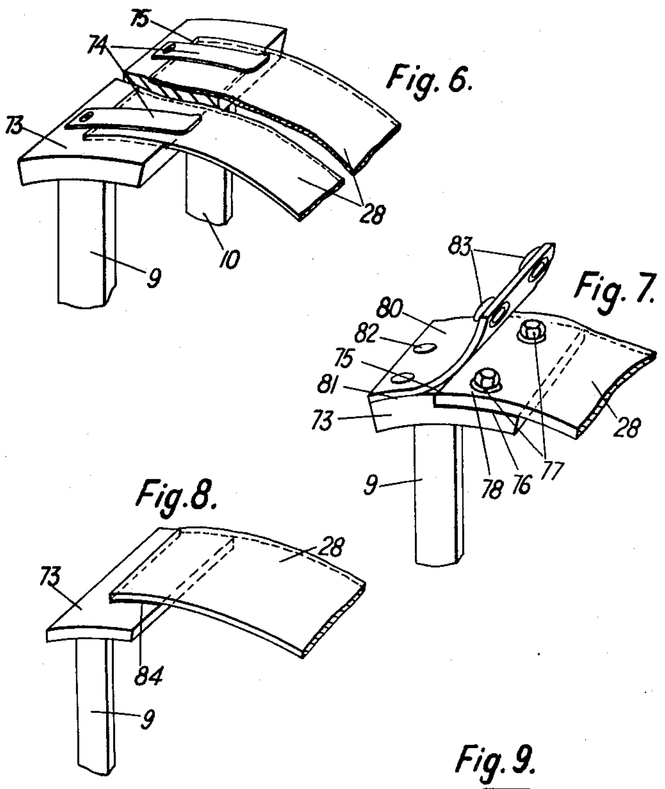

Alternative arrangements may be made to affix the message-form to a towing-bar. One such arrangement is shown in FIG. 6, in which the towing-bar 73 consists of a single member supported by radial arms 9 and 10 at each end. A number of spring clips 74 are fitted along the length of the towing-bar 73 as shown, and provision is made to locate the message-form 28 squarely on the towing-bar by having the towing-bar machined to provide a recess into which a leading portion of the message-form 28 is located so that its upper surface is substantially level with the upper surface of the towing-bar. The spring clips 74 therefore serve to securely hold the message-form in place with its leading edge 75 square against the longitudinal wall of the machined portion.

Another arrangement is shown in FIG. 7 in which the towing-bar 73 again comprises a single member supported at each end by a radial arm, such as that which is designated 9. Only one end of the towing-bar is shown in this figure, and it is machined along its length on its top surface to provide a stepped portion 76 which is shown heavily lined. The male members 77 of a number of pairs of snap fasteners are affixed along the length of the stepped portion 76 of the towing-bar 73. The message-form 28 is perforated with a number of holes 78 near and parallel to its leading edge 75, so that its leading portion may be accommodated on the stepping portion 76 and arranged thereon so that the male members 77 of the snap fasteners extend through mating holes 78 in the message-form 28. A flap 80 of flexible material is affixed to the towing-bar along the unmachined portion 81 by rivets 82 or other similar fixing means. The female members 83 of the pairs of snap fasteners are affixed along the flap 80 so that when the flap is laid parallel with the upper surface of the towing-bar the female members may be snapped onto male members 77 so as to retain the message-form securely onto the towing-bar.

A further arrangement is shown in FIG. 8 in which the towing-bar 73 comprises a single member supported at each end by a radial arm, such as that which is designated 9. Only one end of the towing-bar is shown in FIG. 8. In this arrangement, a leading portion of the message-form 28 is treated so as to make it self-adhesive, that is to say that an adhesive material when applied, has a viscosity such that the adhesive does not "run" and remains tacky over a wide range of temperatures for a considerable period of time. Its adhesive properties being such that if the exposed area of adhesive, the edge of which is designated 84, is pressed onto the towing-bar, it will adhere thereto with sufficient strength to retain the message-form thereon during its rotation within the annular space 61 between the drum 1 and the cylinder 5 of the scanner shown in FIGS. 1 and 4.

Figure 9:
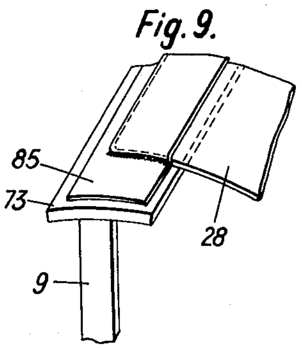

A modification of the last described arrangement is shown in FIG. 9. In this figure, a strip of flexible material 85 is coated on one side with an adhesive of the type described with reference to FIG. 8. The message-form 28 has a leading portion placed onto the top surface of the towing-bar 73 after which the strip of flexible material is applied with the adhesive side downward so that it adheres to the upper surface of the leading portion of the message-form and also the areas of the upper surface of the towing-bar surrounding the leading portion. The message-form will thus be retained on the towing-bar 73 during its rotation within the annular space 61 between drum 1 and cylinder 5 of the scanners shown in FIGS. 1 and 4.

While the principles of the invention have been described above in connection with specific embodiments, and particular modifications thereof, it is to be clearly understood that this description is made only by way of example and not as a limitation on the scope of the invention.

What we claim is:

1. Facsimile apparatus comprising means for scanning a message-form, said means comprising a cylinder through a portion of which scanning may be accomplished, a drum arranged coaxially within the said cylinder so as to leave an annular space therebetween, a shaft arranged coaxially through said drum, means rotatable about the axis of the said shaft for causing a message-form to be moved over the surface of the said drum and relative thereto within the confines of the said annular space, and means for maintaining any portion of the message-form being scanned in a scanning position against the surface of the drum.

2. Facsimile apparatus, as claimed in claim 1, in which said cylinder has a longitudinal aperture through which scanning is accomplished.

3. Facsimile apparatus, as claimed in claim 1, in which said cylinder, said drum, and said shaft are supported in fixed relationship one to another.

4. Facsimile apparatus, as claimed in claim 1, in which said shaft is free to rotate with respect to said cylinder, and in which said drum is supported by and free to rotate on said shaft.

5. Facsimile apparatus, as claimed in claim 1, in which said rotatable means comprises a towing-bar which is radially supported about the axis of the said shaft.

6. Facsimile apparatus as claimed in claim 5, in which said towing-bar comprises a number of spring clips attached thereto at intervals along its length and by which means a leading portion of the said message-form is retained thereon.

7. Facsimile apparatus, as claimed in claim 5, in which said towing-bar comprises an upper jaw and a lower jaw between which a leading portion of the said message-form is gripped and in which spring means are provided for retaining the said jaws in a closed condition.

8. Facsimile apparatus, as claimed in claim 5, in which said towing-bar is supported by a pair of radial arms affixed to said shaft and rotatable therewith about its axis.

9. Facsimile apparatus, as claimed in claim 5, in which the said towing-bar comprises a strip of material.

10. Facsimile apparatus, as claimed in claim 9, in which a leading portion of the message-form is attached to the strip by adhesion thereto.

11. Facsimile apparatus, as claimed in claim 5, in which said towing-bar is supported and free to rotate on said shaft about the axis thereof by a pair of radial arms.

12. Facsimile apparatus, as claimed in claim 11, in which there is provided in the surface of the drum opposite to the said scanning portion of said cylinder a depressable longitudinal sector, and cam means adjacent an end of said sector and in the path of said towing-bar for causing the towing-bar to depress the said sector inward from the surface of the drum when said towing-bar is passing said sector and to occupy substantially the space vacated by the said sector.

References Cited in the file of this patent

UNITED STATES PATENTS

| | | |
|---|---|---|
| 339,092 | Frieseke | May 30, 1886 |
| 957,257 | Robinson et al. | May 10, 1910 |
| 1,128,390 | Upham | Feb. 16, 1915 |
| 2,182,115 | Carlson | Dec. 5, 1939 |
| 2,447,473 | Finch | Aug. 17, 1948 |

FOREIGN PATENTS

| | | |
|---|---|---|
| 744,197 | Great Britain | Feb. 1, 1956 |